United States Patent [19]

Meyer et al.

[11] B 3,924,946
[45] Dec. 9, 1975

[54] METHOD OF AND APPARATUS FOR PRODUCING ENLARGED REPRODUCTIONS OF VESICULAR IMAGE NEGATIVES

[75] Inventors: Rudolf Meyer; Erwin Ranz, both of Leverkusen, Germany

[73] Assignee: Agfa-Gevaert Aktiengesellschaft, Leverkusen, Germany

[22] Filed: June 4, 1973

[21] Appl. No.: 366,287

[44] Published under the Trial Voluntary Protest Program on January 28, 1975 as document no. B 366,287.

[30] Foreign Application Priority Data
June 8, 1972 Germany.............................. 2227854

[52] U.S. Cl...................... 355/18; 96/27 R; 355/71
[51] Int. Cl.[2]................... G03B 27/00; G03C 5/04; G03B 27/76

[58] Field of Search .................. 355/18, 71, 33, 77; 96/27 R

[56] References Cited
UNITED STATES PATENTS
3,374,706  3/1968  Weisglass........................ 355/71 X
3,716,298  2/1973  Reardon ............................ 355/71

Primary Examiner—Richard A. Wintercorn
Attorney, Agent, or Firm—Connolly & Hutz

[57] ABSTRACT

An enlarger for vesicular-image negatives comprises a light source, a condenser for illuminating the vesicular-image negative and an enlarging lens. Diffuser discs differing from one another in their diffusion characteristics are introduced between the vesicular-image negative and the condenser. In this way, the optical density and hence the gradation of the vesicular-image can be varied within wide limits.

2 Claims, 2 Drawing Figures

METHOD OF AND APPARATUS FOR PRODUCING ENLARGED REPRODUCTIONS OF VESICULAR IMAGE NEGATIVES

This invention relates to an enlarger for vesicular-image negatives, which comprises in known manner a light source, a condenser for illuminating the vesicular-image negative and an enlarging lens.

Vesicular images are formed by the diffusion of light rather than by the absorption of light. Accordingly, the vesicular image diffuses light at the image areas, whilst the unexposed parts of the layer allow through most of the incident light. Consequently, a vesicular image appears dark in transmitted light, but light when viewed in reflected light.

When the vesicular negative is reproduced through a lens, it is generally not possible to use all the light emanating from the vesicular negative for reproduction of the image. In general, only a fraction of the incident light is used for viewing or enlargement. In principle, therefore, the vesicular image has the same optical effect as an absorption image.

It has now been found that the optical density of such a vesicular image is governed to a very considerable extent by the opening angle of the illuminating and image-reproducing light beam. This is in complete contrast to a normal absorption image.

A new enlarger for vesicular-image negatives has now been developed on the basis of this discovery.

According to the invention there is provided an enlarger for vesicular-image negatives comprising a light source, a condenser for illuminating the vesicular-image, an enlarging lens, and a holder for diffuser discs arranged between the vesicular-image negative and the condenser.

An advantage of the invention is that the optical densities and hence the gradation of a vesicular image can be varied within wide limits simply by introducing diffuser discs differing in their diffusion characteristics. As a result, a single gradation class of the photographic enlarging paper or film is sufficient for enlarging vesicular-image negatives because the required gradation is obtained simply by introducing another diffusion disc. This has the practical consequence that the photographer is able to manage with a far smaller stock of enlarging material.

The invention is described below in more detail with reference to a diagram illustrating the principle of the invention and one example of its embodiment. In the accompanying drawings.

Figure 1:
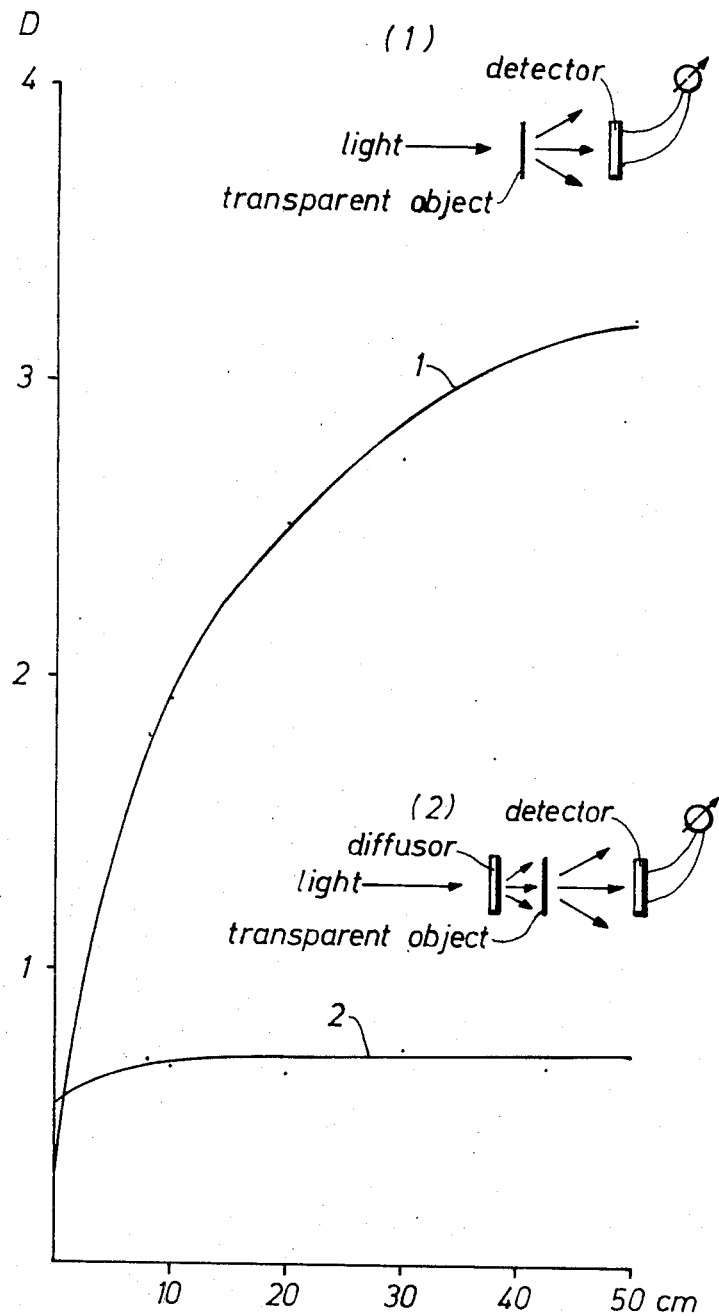
FIG. 1 is a diagram which illustrates the dependence of optical density upon the opening angle in the case of a vesicular image.

Curve 1 in FIG. 1 represents the optical density of the vesicular image illuminated with direct parallel light, as measured at different distances from the specimen, i.e., with different opening angles. It will be seen in this case that optical density is affected to a very large extent by the opening angle of the issuing beam.

Figure 2:
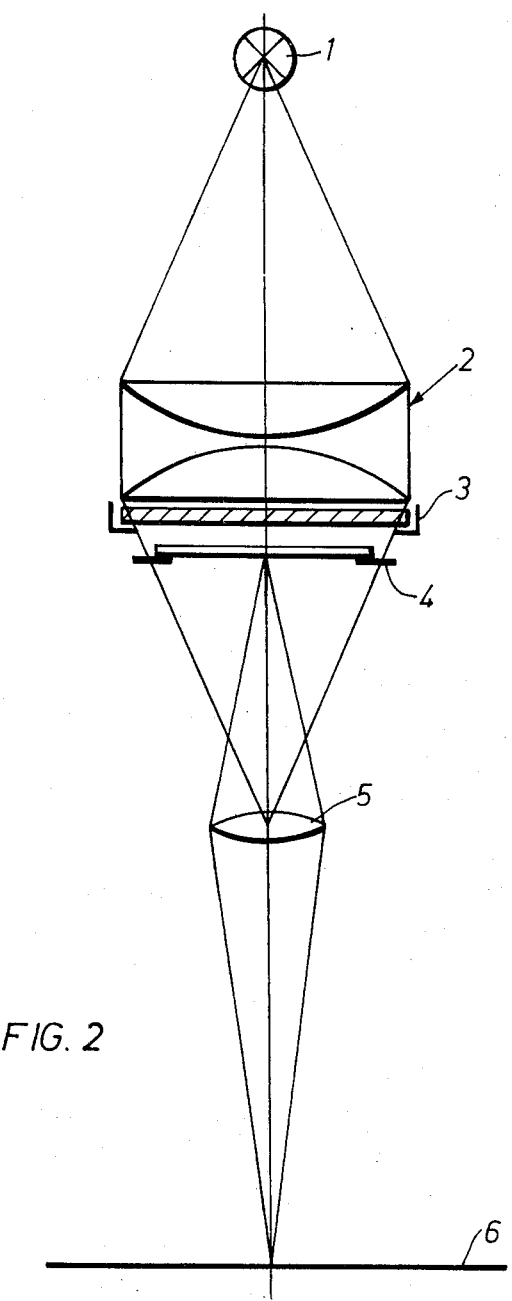
FIG. 2 illustrates the optical beam path in the enlarger.

Curve 2 represents the optical density of the vesicular image illuminated with total diffusion by means of an opal discs. The dependence of density upon the opening angle of the issuing beam is very small in this case. If the distance between the vesicular image and the receiver is kept constant and only the type of lighting changed from direct to completely diffuse light by introducing diffuser discs differing in their diffusion degree or characteristic, the measured density in the graph varies on a vertical line from curve 1 to curve 2 and vice versa. The invention is based on the principle illustrated by these tests. FIG. 2 shows the beam path for one embodiment of the invention. An enlarger comprises a light source 1, a condenser 2, a diffuser-disc holder 3, a holder 4 for a vesicular-image negative and an enlarging lens 5. The vesicular image is reproduced enlarged in an image plane 6. The gradation of the enlarged vesicular image can be controlled within wide limits by introducing diffuser discs differing from one another in their diffusion characteristics.

What we claim is:

1. An enlarger for producing enlarged reproductions of a vesicular image negative comprising a light source capable of issuing a light beam, a condenser receiving the light beam, a vesicular image negative receiving and scattering the condensed light and an enlarging lens receiving the scattered light to form an enlarged reproduction of the image wherein the improvement comprises light scattering diffusion means positioned between the condenser and the image negative to determine the density of the reproduced image by the scattering power of the light scattering diffusion means.

2. The method of producing enlarged reproductions of a vesicular image negative, which comprises the steps of passing a light beam from a light source through a condenser, on to a vesicular image negative, passing the light scattered by the image negative through an enlarging lens to produce an enlarged image wherein the improvement comprises positioning between the vesicular image negative and the condenser a diffuser member, producing diffused light, illuminating the vesicular image with said diffused light, and adjusting and controlling the density in the enlarged reproduction by inserting diffusers, having different diffusion characteristics.

* * * * *